(12) United States Patent
McCarrick (10) Patent No.: US 7,438,939 B2
(45) Date of Patent: Oct. 21, 2008

(54) MULTI-FLAVORED DESSERT CAKES

(76) Inventor: William M. McCarrick, 26 Canada Road, Cobham, Surrey (GB) KT11 2BA ( * ) Notice: Subject to any disclaimer, the term of this patent is extended or adjusted under 35 U.S.C. 154(b) by 834 days.

(21) Appl. No.: 10/461,361

(22) Filed: Jun. 16, 2003

(65) Prior Publication Data

US 2003/0215554 A1 Nov. 20, 2003

(51) Int. Cl.
*A21D 13/08* (2006.01)
(52) U.S. Cl. .................... 426/94; 426/275; 426/496; 426/660
(58) Field of Classification Search .................. 426/94, 426/275, 128, 660, 496
See application file for complete search history.

(56) References Cited

U.S. PATENT DOCUMENTS 4,362,751 A 12/1982 Dogliotti
4,431,681 A 2/1984 Hegedus et al.

OTHER PUBLICATIONS

Ultimate Cake, 1996, pp. 65, 153.*
Fresh Ways with Pastries & Sweets, 1988, pp. 74-77.*
Cindy Mushet, "The Pleasures of Layer Cake", Bon Appétit Magazine (Apr. 2003) pp. 110-117. (Los Angeles, USA).
Newspaper Article (unknown author). Atlantic County Record NJ (Apr. 11, 2002) pp. 7, 9.
Elaine Rose, "Harrods' Pastry Chef got training at ACCC", The Press of Atlantic City NJ (Aug. 25, 2001) pp. B1, B3.
Newspaper Article (newspaper and author unknown) "Bake me an Opera Cake", Dubai (2000-2001).

* cited by examiner

*Primary Examiner*—Lien Tran (57) ABSTRACT

Multi-flavored dessert cakes and new combinations of flavors for dessert cakes are disclosed. In preferred embodiments, the invention provides multi-flavored cakes that each combine a number of different ingredients from a particular geographic location or culture of the world, merging the flavors of those ingredients with the traditional flavors of a European dessert cake, in particular chocolate. In one aspect, a multi-flavored dessert cake comprises a plurality of sponge cake portions, each sponge cake portion being capable of absorbing a flavored syrup. At least one sponge cake portion is soaked with a syrup having a first flavor and at least one other sponge cake portion is soaked with a syrup having a second flavor, so that each soaked sponge layer takes on a different flavor. The invention is particularly well-suited to provide new versions of the traditional opera cake.

18 Claims, 6 Drawing Sheets

MULTI-FLAVORED DESSERT CAKES

FIELD OF THE INVENTION

The present invention relates to the fields of food and food preparation. More particularly, it relates to dessert cakes and methods for preparing dessert cakes.

BACKGROUND OF THE INVENTION

For centuries dessert cakes of European (and especially French) origin have been renowned for their quality, popularity, and general gastronomical excellence. The term "dessert cake" or "cake" (used interchangeably herein) is intended to embrace any sweetened, usually baked, composition of any size or shape, at least a portion (e.g., one or more layers) of which is typically made from flour, sugar/sweetener, liquid, and eggs, in addition to other possible ingredients such as flavorings and raising agents. Thus, for example, the term includes layered cakes, pastries, mousses (with or without flour), "gateaux", tortes, and petit fours.

European cakes, though varied in taste and form, have generally been based in various combinations on the principal ingredients of cream, eggs, sugar, coffee, and chocolate (i.e., cocoa). While more subtle flavors (for e.g., vanilla, fruit, nuts, liqueurs) have been added and combined into European cakes, the selection of these flavors has still remained largely dictated and dominated by only traditional Western/European ingredients, influences, and culture.

On the other hand, outside the dessert realm, there has been a major proliferation of ethnic foods/ingredients and fusion cuisine (i.e., the blending of ingredients and food preparation techniques from different cultures) in Western and European culture. See, for example, "The Last Bite: No Quit to Ethnic Cuisines", *Prepared Foods* (November 1999) and "An Emerging Market: As major companies enter the fray, the ethnic foods market continues to grow-both in number of consumers and in varieties of products", *Prepared Foods* (October 2002). Indeed, food consumers are increasingly looking for new, different, and even revolutionary types of foods. See for example, "Far-out Forecasting and Wishful Thinking: Part 2", *Specialty Food Magazine* (April 2003).

Since this vast and diverse growth in the food industry has to a considerable extent bypassed the dessert cake field, a very large gap in the dessert food industry has been left untapped, both from a commercial and a gastronomical perspective.

SUMMARY OF THE INVENTION

The present invention relates to multi-flavored dessert cakes and to new combinations of flavors for dessert cakes. In preferred embodiments, the invention provides multi-flavored cakes that each combine a number of different ingredients from a particular geographic location or culture of the world, merging the flavors of those ingredients with the traditional flavors of a European dessert cake, in particular chocolate.

The invention provides a multi-flavored dessert cake comprising a plurality of sponge cake portions, each sponge cake portion being capable of absorbing a flavored syrup. At least one sponge cake portion is soaked with a syrup having a first flavor (i.e., it includes an ingredient providing that first flavor), and at least one other sponge cake portion is soaked with a syrup having a second flavor (i.e., it includes an ingredient providing that second flavor). The second flavor is different from the first flavor, so that each soaked sponge layer takes on a different flavor.

The multi-flavored dessert cake further comprises at least one filling portion that has a third flavor that is also different from the first and second flavors. In accordance with the present invention, the first, second, and third flavors comprise one of the following four flavor combinations.

In a first flavor combination, one of the first, second, and third flavors comprises a lemongrass flavor, another a mango flavor, and another a caramel flavor. The cake also includes pineapple, ginger, pandan, and coconut flavors in this embodiment.

In a second flavor combination, one of the first, second, and third flavors comprises a mulled wine flavor, another a rhubarb flavor, and another an elderflower flavor. The cake also preferably includes apple and orange flavors in this embodiment.

In a third flavor combination, one of the first, second, and third flavors comprises a lavender flavor, another a basil flavor, and another a cassis flavor. The cake also preferably includes grappa, balsamic, and tomato flavors in this embodiment.

In a fourth flavor combination, one of the first, second, and third flavors comprises a passion fruit flavor, another a mint flavor, and another a eucalyptus flavor. The cake also preferably includes coriander, apple, and mango flavors in this embodiment.

The cake may be an opera cake in which each portion is a layer within the cake, and at least one filling layer lies between any two sponge cake layers. In this case, the sponge cake layers are preferably a Joconde type sponge comprising an almond flavor, and more preferably they comprise at least 4% butter, 20% nuts, and 25% whole eggs in terms of pre-cooked ingredient weight.

In another aspect of the present invention, a cake comprising the novel combination of lemongrass, mango, coconut, and pineapple flavors is provided. This cake also preferably incorporates ginger, caramel, pandan, and white chocolate flavors as well. Again, the cake preferably includes one or more sponge cake portions capable of absorbing one or more of the flavors.

In another aspect of the present invention, a cake comprising the novel combination of mulled wine (i.e., glögg) and rhubarb flavors is provided. This cake also preferably incorporates elder flower, apple, and orange flavors as well. Again, the cake preferably includes one or more sponge cake portions capable of absorbing one or more of the flavors.

In another aspect of the present invention, a cake comprising the novel combination of lavender and basil flavors is provided. This cake also preferably incorporates cassis, grappa, balsamic, and tomato flavors as well. Again, the cake preferably includes one or more sponge cake portions capable of absorbing one or more of the flavors.

In another aspect of the present invention, a cake comprising the novel combination of passion fruit, mint, and eucalyptus flavors is provided. This cake also preferably incorporates coriander, apple, and mango flavors as well. Again, the cake preferably includes one or more sponge cake portions capable of absorbing one or more of the flavors.

Advantageously, cakes of the present invention, when frozen, may be preserved for long periods (e.g., up to six months) without a degradation in quality or taste when subsequently sliced and thawed. Because of the long freezer shelf life, the cakes of the present invention can be manufactured and sold in wide-spread commercial applications, for instance as high quality frozen grocery items in food stores.

BRIEF DESCRIPTION OF THE DRAWINGS

The objects and advantages of the present invention will be better understood and more readily apparent when considered in conjunction with the following detailed description and accompanying drawings which illustrate, by way of example, preferred embodiments of the invention and in which.

DETAILED DESCRIPTION OF PREFERRED EMBODIMENTS

Although the present invention is not limited to any specific type or form of dessert cake, it is advantageously directed to dessert cakes that include one or more sponge cake portions (typically, these sponge portions are layers but they may generally be of any shape or size). Sponge cake is a light, porous cake—usually made from flour, sugar, eggs and often butter or oil—that is capable of absorbing other flavors. The invention is more preferably directed to dessert cakes that include both sponge cake and filling portions, typically with the filling portions located adjacent and/or in between the sponge cake portions. In particular, one such cake is the well-known opera cake which has a series of sponge and filling layers that is extremely well-suited for incorporation of the invention's unique combinations of multiple flavors. As a result, the remainder of this description of preferred embodiments of the invention will be exemplarily directed at opera cake embodiments.

Figure 1:
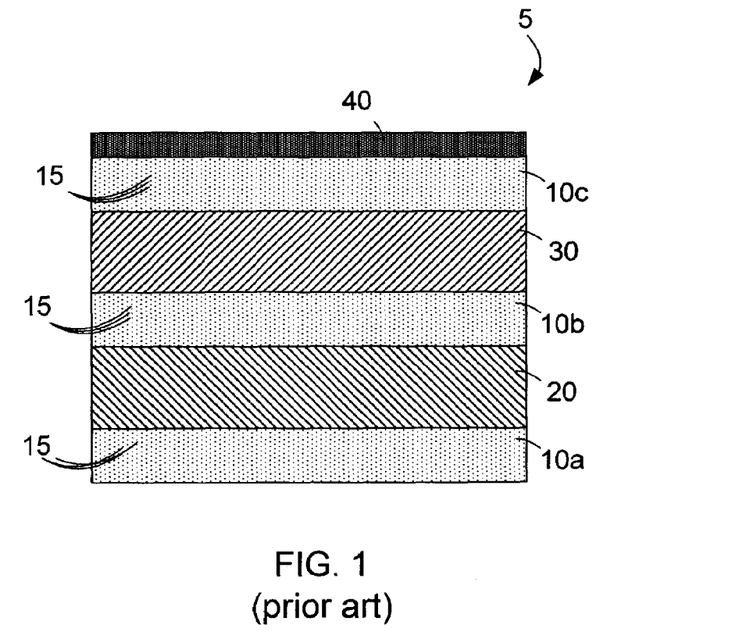
FIG. 1 is a side view showing the typical layers in a traditional opera cake.

A conventional opera cake 5, based in the flavors of coffee and chocolate, is shown in side view in FIG. 1. Cake 5 has three layers of Joconde biscuit 10, which is a light almond sponge cake made from whole eggs, flour, almonds, sugar and butter. More specifically, cake 5 comprises a bottom Joconde layer 10*a*, a middle Joconde layer 10*b*, and a top Joconde layer 10*c*. Each Joconde layer 10*a*, 10*b*, and 10*c* is soaked with an espresso syrup, represented by particles 15, and alternately layered with a mocha buttercream 20 and a chocolate ganache 30, as shown. The coffee syrup may be formed from water, sugar and coffee. Cream layer 20 may comprise butter cream and coffee essence, and ganache 30 may comprise milk, cream, dark chocolate and butter. A chocolate glaze layer 40 is subsequently applied onto the top of Joconde layer 10*c*.

Generally, the layer of ganache paste 30 comprises at least a chocolate unit and a liquid unit formed from cream, fruit juice, and/or liqueur. In some modified versions of the opera cake, cream layer 20 and/or ganache 30 includes a white chocolate base. Nevertheless, the syrup used to soak Joconde layers 10, the intermediate ganache 20 and/or cream 30 layers between the Joconde biscuits, and glaze 40 all still generally centre around the flavors of coffee and chocolate (including white chocolate), typically without any other significant flavor influences. Furthermore, the same syrup 15 is used to soak all of the Joconde layers 10 within cake 5. This also limits the number or variety of flavors within cake 5.

In this manner, the ingredients used in European dessert cakes such as opera cakes have generally been limited to the traditional ingredients described above. The present inventor believes this is due to a general expectation among those skilled in the art that the incorporation of unusual or ethnic ingredients (or combinations of such ingredients) into traditional European desserts will be unpalatable or at least very difficult to render palatable. However, through years of experimentation and research, the present inventor has found that, while integrating such ingredients into dessert cakes is a difficult task venturing into a generally unchartered area, suitable combinations of different and varied flavors can be deliciously palatable when incorporated into such cakes and hence boast the potential for immense commercial popularity.

In accordance with the invention, the present inventor has created a plurality of new flavor combinations for dessert cakes, each combining a number of different ingredients from a particular geographic location or culture of the world to merge the flavors of those ingredients with those of a traditional European dessert cake (in particular, chocolate). In addition to the uniqueness of these flavor combinations, the relative strengths and proportions of the ingredients used in each flavor combination, enables many of the flavors to be emphasized in a sequential manner (i.e., one after the other), further highlighting the different flavors in each case.

As noted, while each of these combinations is described in detail below in connection with the implementation of new versions of an opera cake, it will be appreciated that the ingredients may also be combined to form new versions of other cakes, especially other traditional European dessert cakes that include sponge portions or layers. Examples of such cakes include: Zuger Kirschtorte, black and white forest cakes, rolled log cakes, tiramisu, ice cream cakes, bagatelles, baba au rhums, savarins, brazilianas, and charlottes.

Opera Cake Layout

Figure 2:
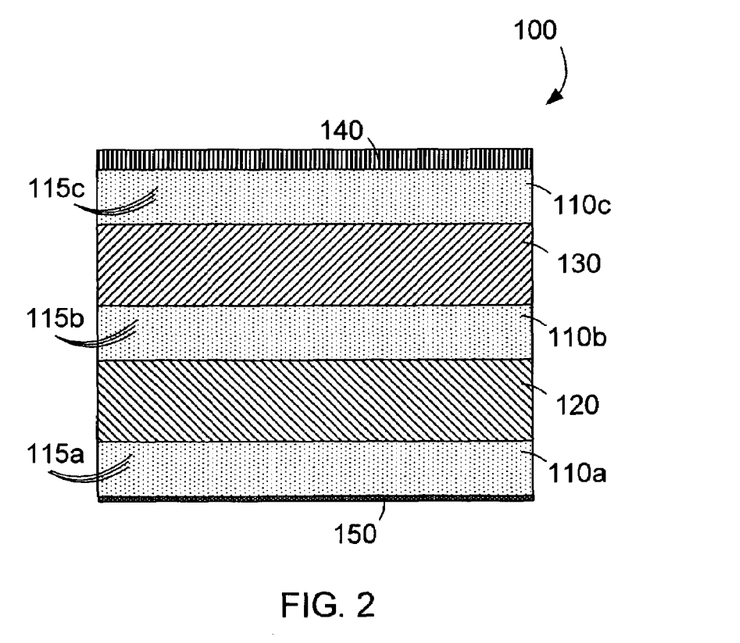
FIG. 2 is a side view showing the general layout of the layers in an opera cake in one embodiment of the present invention.

FIG. 2 shows the general layout of an opera cake 100 in accordance with one embodiment of the present invention. As shown, cake 100 includes three sponge cake layers 110*a*, 110*b*, and 110*c* sandwiching two intermediate filling layers 120 and 130. In the illustrated embodiment, cake 100 comprises a bottom sponge layer 110*a*, a middle sponge layer 110*b*, and a top sponge layer 110*c*. Each sponge layer 110*a*, 110*b*, and 110*c* is respectively soaked with a flavored syrup (i.e., liquid) 115*a*, 115*b*, and 115*c* to provide that layer with a desired flavor.

In accordance with one aspect of the present invention, different sponge layers within each cake may be soaked with different syrups so that each sponge layer can take on a different flavor from the others. (When soaked with different syrups the layers may also have different textures and colors.) This is unlike traditional cakes (such as cake 5 in FIG. 1) in which all of the sponge cake layers take on the same flavor, limiting the variety of flavors within the cake.

As shown in FIG. 2, a first intermediate filling layer 120 is sandwiched between bottom sponge layer 110*a* and middle sponge layer 110*b*, and a second intermediate filling layer 130 is sandwiched between middle sponge layer 110*b* and top sponge layer 110*c*. Intermediate filling layers 120 and 130 are preferably comprise a ganache, jelly, or other type of cake filling. The filling layers may have a smooth or a crunchy texture. Preferably, the filling layers do not comprise eggs (as would be the case for instance in a mousse or custard layer) so the taste and quality of such layers tends to deteriorate when the cake is stored in a frozen environment for relatively long periods. Cake 100 further includes a top glaze layer 140 and a bottom base layer 150. Generally, the number and order of sponge and filling layers may vary. For example, in other embodiments the number of sponge layers could also be more or less than three. In addition, some cakes may have different sponge layers adjacent to one another or different filling layers adjacent to one another.

Within the layout of opera cake 100, the syrups 115*a*, 115*b*, 115*c* for soaking sponge layers 110, the intermediate filling layers 120 and 130, and the glaze layer 140 may comprise the ingredients used in the new dessert cake flavor combinations of the present invention. However, before turning to specific flavor combinations, preferred methods for (i) preparing the sponge cake layers 110*a*, 110*b*, 110*c*, (ii) preparing ganache filling layers 120 and/or 130, and (iii) assembling opera cake 100 are first described.

Sponge Cake (Joconde Biscuit)

Although the cakes of the present invention can use any type of sponge cake, a Joconde biscuit type sponge is preferably used. Furthermore, it is especially preferred that the following composition and method of preparation are used for sponge cakes layers 110*a*, 110*b*, 110*c* (the method is illustrated in the flow diagram of FIG. 3). This composition and method of preparation provide highly absorbent sponge cake layers capable of being heavily soaked with desired syrups (i.e., liquids), so that they are better able to take on more of a desired flavor.

It should be noted that the exemplary quantities of ingredients referred to below are used to form nine sheets (or trays) of Joconde biscuit, each sheet being approximately 60 cm×40 cm (i.e., the size of a commercial baking tray) and containing Joconde biscuit weighing roughly 550 g. This amount of Joconde biscuit is then used to produce three similarly sized trays of opera cake 100 (i.e., with three Joconde sponge layers per tray of cake 100). As will be appreciated, the quantities provided can be scaled up or down as desired to provide a greater or lesser amount of Joconde biscuit.

Figure 3:
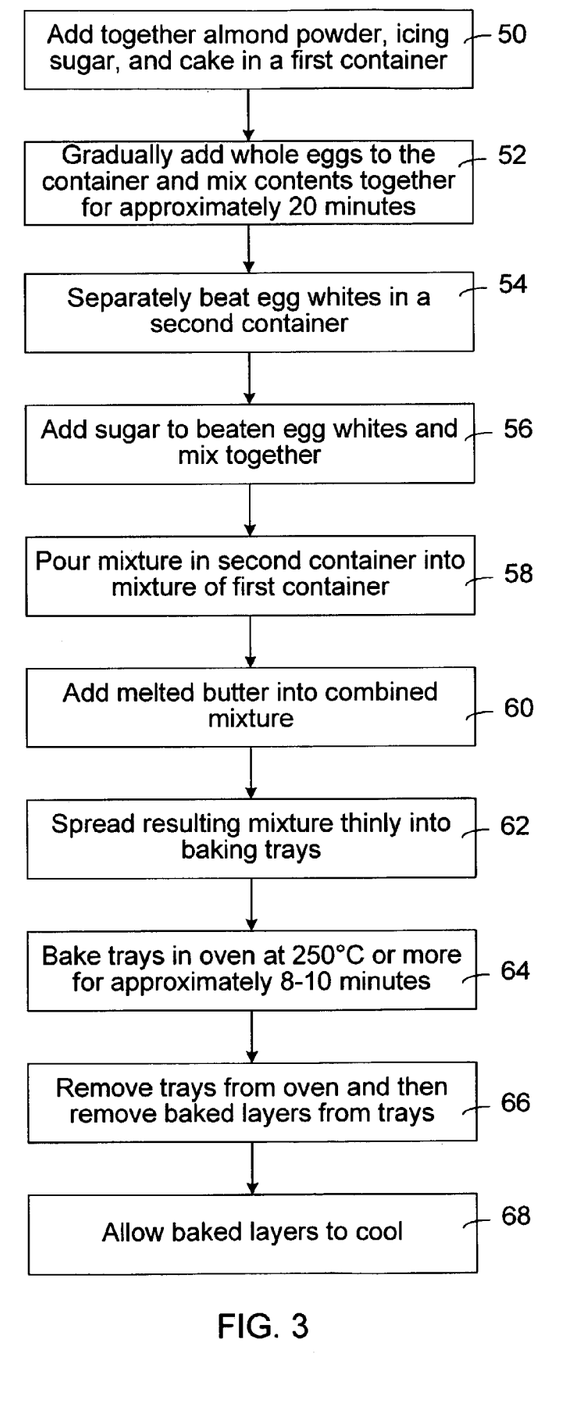
FIG. 3 is a flow diagram illustrating a preferred method of preparing Joconde biscuit layers for cakes in embodiments of the present invention.

Referring to FIG. 3, at step 50, 1125 g of almond powder, 1125 g of icing sugar, and 300 g of cake flour are initially added together in a mixing bowl or other suitable container. Next, at step 52, 1500 g of whole eggs are added gradually to the container, and the contents are whisked together for approximately 20 minutes. 1100 g (or 1 liter) of egg whites is also beaten separately in another container at step 54, followed by which 150 g of sugar are added to and mixed with the egg whites at step 56 (effectively making a meringue). At step 58, the egg whites and sugar are poured into the mixture of almond powder, icing, sugar, flour, and whole eggs. Subsequently, 225 g of melted butter is also poured into the mixture, as shown at step 60.

Next, at step 62, the resulting mixture is poured into paper-lined baking trays and spread thinly thereover (the finished baking height of the Joconde biscuit is preferably about 5 mm). The mixture is then baked for approximately 8-10 minutes in an oven, as indicated at step 64 in FIG. 3. Preferably, the oven is at a high temperature, e.g., about 250° C., so that the top and bottom surfaces of the spread mixture form a golden brown skin, while the interior part is merely baked. The present inventor has found that baking the biscuit mixture at more conventional lower temperatures (e.g., 200° C.) results in this particular mixture becoming undesirably dry and brittle. When the baked layers of mixture are removed from the oven, they are preferably slid off of the hot baking trays (onto awaiting cake trays) to avoid over-baking and drying out the spongy layers. This is indicated at step 66. Finally, as shown at step 68, the baked Joconde layers are allowed to cool (preferably at room temperature).

The high fat content of the resulting Joconde biscuit—in particular from the butter, the yolks from the whole eggs, and the nuts—provides a desirable sponge texture that is flexible but still provides a very high rate of absorption compared to other types of sponge cakes. To obtain such high absorption, the Joconde biscuit composition preferably comprises, in terms of its pre-baked weight, at least 4% butter, 20% nuts (i.e., almonds), and 25% whole eggs.

Ganache Preparation

Figure 4:
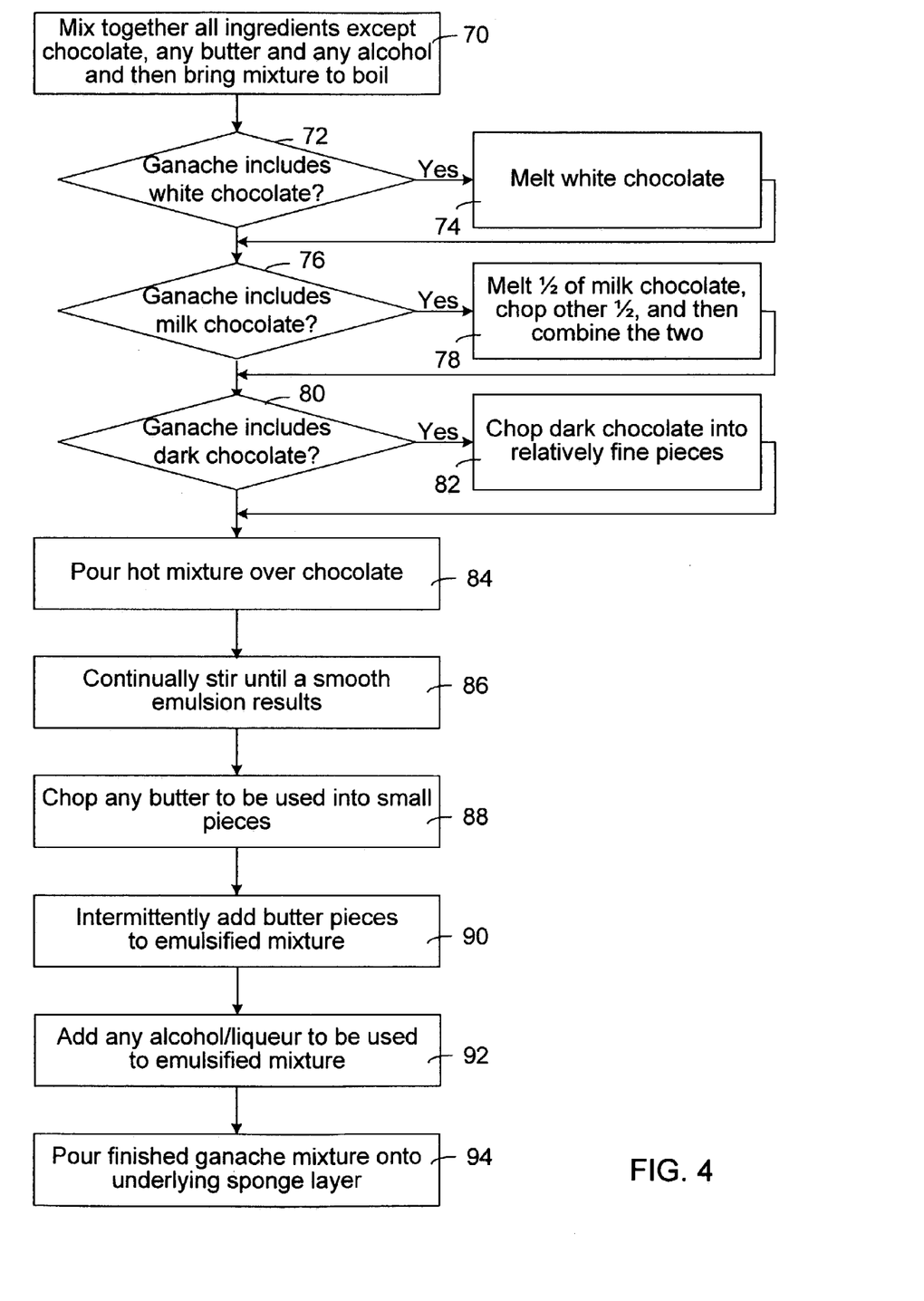
FIG. 4 is a flow diagram illustrating a generalized method of preparing ganache layers for cakes in embodiments of the present invention.

As noted above, intermediate filling layers 120 and/or 130 may comprise a ganache. As used herein, a "ganache" refers to a rich paste comprising chocolate, cream, butter (in many cases), alcohol/liqueur (in many cases), and other flavor-providing ingredients. As described in detail below, the type and quantity of ingredients used vary in different embodiments of the present invention, however, the method of preparing different ganaches for cakes of the present invention is generally the same. FIG. 4 is a flow diagram illustrating such a generalized method of preparing ganache for cakes of the present invention.

Referring to FIG. 4, at step 70, in a saucepan or other suitable container, all of the ingredients for the ganache except the chocolate, any butter that will be used, and any alcohol/liqueur that will be used are mixed together and then brought to a boil.

Depending on the type of chocolate base for the ganache, the next step(s) vary. If the ganache includes a white chocolate base (step 72), all the white chocolate is melted at step 74 so that it is fluid (the temperature of the melted white chocolate is preferably about 45° C.). If the ganache includes a milk chocolate base (step 76), approximately one half of the chocolate is melted and the other half is simply chopped. The two halves are then combined at step 78 so that overall the milk chocolate is between a melted and a set state. If the ganache includes a dark chocolate base (step 80), then at step 82 the chocolate is chopped into relatively fine pieces and is not melted at all. Some ganache layers may comprise more than one type of chocolate, in which case each type of chocolate is separately prepared in the appropriate manner indicated above.

Regardless of whether type of chocolate used is white, milk, or dark, the chocolate is preferably a high quality "couverture" containing a high percentage of cocoa butter—typically, 32% or more—and no other fats or oils. One preferred brand of couverture is the well known VALRHONA® brand produced in France. However, more generally, any brand or quality of chocolate can still be used in the cakes of the present invention, particularly if the cakes are being produced on a very large commercial scale.

With the relevant chocolate base prepared as described above, the hot mixture brought to a boil in step 70 is poured at step 84 over the chocolate (in a new container). At step 86, the combined ingredients are continually stirred until a smooth and uniform emulsion results. An emulsion is a stable immersion or dispersal of a first liquid within a second liquid that is generally immiscible—in this case a, "water-in-fat" type emulsion. This stirring step is preferably performed by the small circular motion of a plastic or wooden spatula having a flexible bowl-scraping flipper edge.(A whisk should not be used since it may incorporate undesirable air bubbles.) As the combined ingredients are stirred, an initial separation of the water (i.e., liquid) and fat occurs, but with continuous stirring a smooth emulsion subsequently results with a continuous flow of liquid within the chocolate. Generally, where non-couverture chocolate is used, it may include stabilizers and/or binding agents that facilitate the emulsion process, however, for a superior taste, couverture chocolate remains preferred.

Next, at step 88, any butter to be included in the ganache is cut into small pieces or cubes. When the temperature of emulsion is at about 35-40° C. (which is generally soon after the ingredients emulsify), the softened butter pieces are then added intermittently to the emulsion at step 90. A hand blender may be used to ensure that the butter also disperses within the emulsion. If the ganache includes any alcohol or liqueur, it is also added at step 92. The resulting emulsified mixture has a smooth, shiny, and uniform texture.

Finally, as indicated at step 94 in FIG. 4, the finished ganache is poured and/or spread onto a previously soaked sponge cake layer (as part of the opera cake assembly process described below). This preferably occurs not more than about 10 minutes after the ganache has been prepared. If the ganache is not used soon after it is prepared, it begins to crystallize and set within the mixing container, making it difficult to form an even ganache layer (without air bubbles or lumps) within the opera cake.

Opera Cake Assembly

Figure 5:
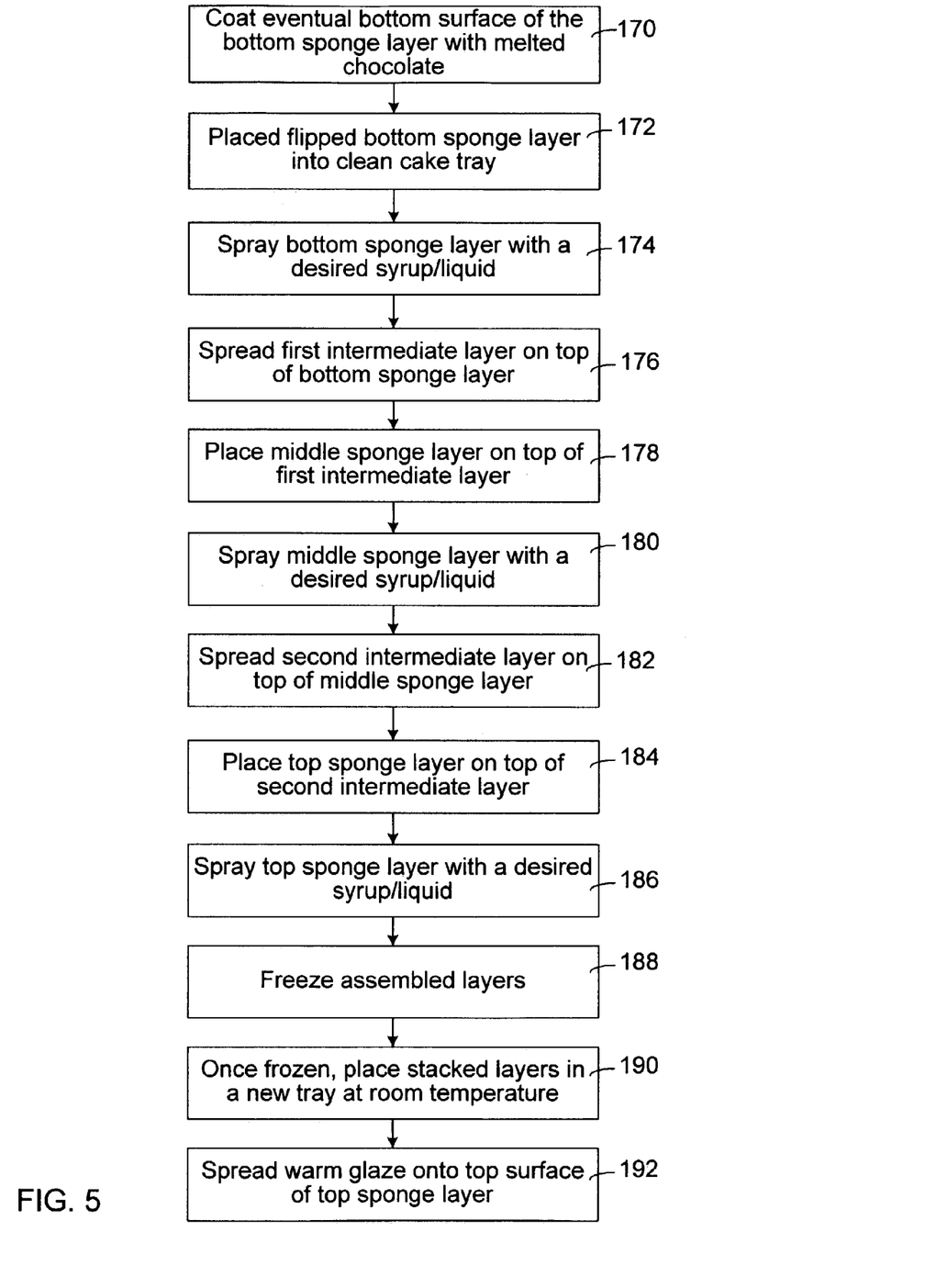
FIG. 5 is a flow diagram illustrating a general method of assembling opera cakes in accordance with a embodiment of the present invention.

Once prepared, sponge layers 110a, 110b, 110c may be used in assembling opera cakes in accordance with the preferred method shown in the flow diagram of FIG. 5.

Referring to FIG. 5, at step 170, the bottom Joconde layer 110a of the eventual cake has its bottom surface coated with a thin layer of melted chocolate. The melted chocolate may be spread onto layer 110a using a spatula, and this is preferably carried out after the layers have already cooled. Once hardened, this bottom chocolate layer provides a firm base 150 (FIG. 2) that supports the moist cake 100.

At step 172, bottom Joconde layer 110a is placed into a clean cake tray which provides a frame during the cake assembly process. The bottom Joconde layer is flipped into the cake tray so that the chocolate coating base layer 150 lies on the bottom of the cake tray. Preferably, a lining of silicon paper (not shown) is placed between the cake tray surface and the bottom Joconde layer to facilitate later removal.

Next, bottom Joconde layer 110a is sprayed with a syrup 115a to provide that layer with a desired flavor as indicated at step 174. To spray the layer, a squirt bottle filled with the flavored syrup 115 of choice can be used. Spraying a sponge cake layer is preferable to the conventional technique of spreading syrup onto the layer with a brush, because the brush may scrape and tear the layer, especially as the sponge absorbs very high quantities of syrup and thereby becomes very sensitive, fragile, and easily torn. Preferred types of syrups are described below, together with preferred methods for their preparation.

Once bottom Joconde layer 110a is heavily soaked, a first intermediate filling layer 120 (preferably a ganache or jelly layer) is poured and/or spread on top of layer 110a. This step is shown at 176 in FIG. 5. As noted above, where filling layer 120 comprises a ganache, it should generally be spread right after it has been prepared so that it is still lucid, fluid, and easy to manipulate. A rapid application of ganache allows it to be spread evenly and uniformly without the formation of air pockets or lumps that may undesirably tear the underlying sponge layer and/or result in uneven layering. Preferred types of fillings suitable for inclusion in cakes of the present invention are described below, together with methods for preparing those filling layers.

Referring still to FIG. 5, at step 178, middle sponge layer 110b is placed on top of the first intermediate filling layer 120. As will be appreciated by those skilled in the art, intermediate filling layer 120 acts to hold or bond the two sponge layers 110a and 110b in place. At step 180, middle sponge layer 110b is sprayed with a flavored syrup of choice 115b.

The second intermediate filling layer 130, which also is preferably either a ganache or a jelly, is next spread on top of the soaked middle sponge layer 110b, as shown at step 182. Like the filling layer 120, filling layer 130 should be spread as uniformly as possible. Subsequently, at step 184, top sponge layer 110c is placed on top of intermediate filling layer 130. Top Joconde layer 110c is then also sprayed with a desired syrup 115c, as shown at step 186. As described further below, in some preferred embodiments, each of sponge layers 110a, 110b, and 110c is soaked with a different syrup than the others. In other preferred embodiments, top and bottom Joconde layers 110a and 110c may be soaked with the same syrup and middle Joconde layer 110b is soaked with a different syrup. Other combinations of soaked layers may also be used in cake 100.

Referring still to FIG. 5, at step 188, the assembled (i.e., stacked) layers in cake 100 are then frozen by placing the cake tray in which they are held into a freezer. Preferably the layers are frozen in a blast freezer at a temperature of about −20° C. and for at least eight hours. Once frozen, the stack is taken out of the cake tray and the silicon paper used to separate the bottom Joconde layer from the cake tray is removed. The frozen stack is then placed on a new opera cake tray that is at room temperature, as indicated at step 190.

At step 192, a warm glaze 140 is spread (e.g., with a spatula) onto the top surface of top Joconde layer 110c. Glaze 140 provides an additional layer of flavor in the cake while also acting as an outer "skin" layer that helps preserve and protect the layers below it. Preferred types of glazes are also described below, together with preferred methods for their preparation. Subsequently, a sharp knife may be used to trim the cake (in particular glaze layer 140) from the side walls of the cake tray. If desired, a garnish may also be added for decorative effect.

The frozen opera cake 100 may now be returned to the freezer for future consumption or it may be sliced and allowed to defrost for more immediate consumption. Advantageously, cake 100 can be subjected to long term freezing (e.g., up to six months or more) without sacrificing its quality, taste or freshness and without requiring the addition of undesirable chemical preservatives. Indeed, the present inventor has found that frozen cakes of the present invention—once sliced and defrosted—generally taste the same regardless of whether they were prepared several weeks or several hours prior. This makes the cakes of the present invention highly suitable for wide-spread commercial applications, in particular for the manufacture and sale as frozen grocery items in food stores.

Having described a preferred method and composition for sponge cake layers 110a, 110b, 110c and a preferred method of assembling opera cake 100, attention will now be turned to four preferred flavor combinations for cake 100 and more particularly it's sponge-soaking syrups, filing layers, and glaze layer. Each of these new flavor combinations uniquely merges a number of different, yet complementary, ingredients from a particular geographic location/culture of the world into the traditional flavors (in particular, chocolate) of a European dessert cake.

The Asian Cake

In one flavor combination of the present invention, an Asian opera cake with ingredients of Asian origin is provided. The Asian opera cake incorporates the novel combination of lemongrass, mango, coconut, and pineapple flavors into an opera cake. Preferably, the Asian opera cake further incorporates ginger, caramel, pandan, and white chocolate flavors as well.

Figure 6:
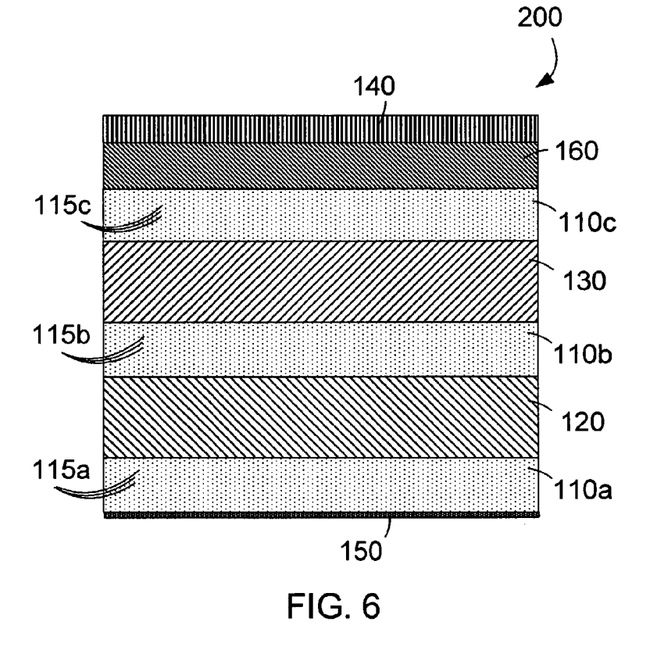
FIG. 6 is a side view showing the general layout of the layers in an opera cake in another embodiment of the present invention.

The Asian opera cake is preferably implemented in the form of an opera cake 200, the general layout of which is shown in FIG. 6. The layout of cake 200 is the same as that for cake 100 in FIG. 2, except that cake 200 includes an additional filling (e.g., ganache) layer 160 between top sponge layer 110c and glaze layer 140. During the assembly of cake 200, filling layer 160 is simply spread on top of sponge layer 110c.

In a preferred embodiment of the Asian opera cake, sponge layers 110 are soaked with a lemongrass syrup 115a, 115c and a caramel syrup 115b; intermediate filling layer 120 comprises a lemongrass ganache layer; intermediate filling layer 130 comprises a mango jelly layer; filling layer 160 comprises a coconut ganache layer; and glaze layer 140 includes a white chocolate glaze. Base layer 150 is preferably a white chocolate layer. It will be appreciated that the above layers may be ordered differently and in numerous other manners. For example, two sponge layers 110 may be soaked with the caramel syrup and only one with the lemongrass syrup. As another example, the order of filling layers 120, 130, and 160 may be changed.

Specific preferred compositions (and, where appropriate, methods of preparation) are now given for the preferred layers in the Asian cake. As above, the exemplary quantities of ingredients referred to below are used to fill three opera cake trays, each tray being approximately 60 cm×40 cm (i.e., the size of a commercial baking tray). To produce different amounts of cake, these quantities may be scaled up or down as desired.

Both lemongrass syrup 115a/115c and lemongrass ganache 120 are formed from a lemongrass base comprising 2200 g fresh lemongrass and 2360 g heavy cream. The fresh lemongrass and cream are combined, brought to a boil for about 15 minutes. The boiled mixture is then allowed to steep for approximately one hour (for thorough flavor extraction) and then it is passed through a sieve to provide about 1650 g of the lemongrass base.

Lemongrass syrup 115a/115c may then be prepared by combining 950 g of the lemongrass base with 420 g of pineapple purée and 430 g of coconut-flavored rum (e.g., MALIBU® rum).

Lemongrass chocolate ganache 120 may comprise 400 g of the lemongrass base, four vanilla pods (a vanilla pod or bean typically weighs about 15 g), 80 g invert sugar (e.g., trimoline), 880 g of white chocolate, 110 butter, and 30 g of coconut-flavored rum (e.g., MALIBU® rum). The lemongrass chocolate ganache can be prepared using the method described above in connection with FIG. 4.

Caramel syrup 115b may comprise 300 g of sugar, 300 g of mango purée, 300 g of coconut purée, and 300 g of coconut-flavored rum (e.g., MALIBU® rum). This syrup is prepared by first caramelizing the sugar by slowly cooking the sugar in a pan over a low heat. Then the caramelized sugar is deglazed by slowly adding the mango purée to the bottom of the pan, thereby liquefying the caramelized drippings. The coconut purée and the coconut-flavored rum are then added to the deglazed liquid.

Mango Jelly 130 may comprise 1,360 g of mango purée, 70 g of invert sugar (e.g., trimoline), 55 g of freshly ground ginger, and 15 sheets of gold gelatin in leaf form (generally, four sheets of leaf gelatin are equivalent to one, 7 g (i.e., ¼-ounce) package/envelope of powdered gelatin). The mango jelly is prepared by mixing the mango purée, invert sugar, and ground ginger and then bringing the mixture to a boil. The mixture is allowed to continue boiling until it is reduced by one quarter in volume (thereby intensifying its flavor). The reduced mixture is then passed through a sieve, and once it has cooled slightly (but while still warm), the 12 sheets of gelatin are added. (Prior to this, the gelatin sheets are softened by soaking them in cold water for about 10 minutes and then squeeze-drying them to remove the water.)

Coconut chocolate ganache 160 may comprise 475 g of coconut purée, 50 g of chopped pandan leaves, 105 g of invert sugar, 50 g of grated desiccated coconut, 790 g of white chocolate, and 80 g coconut-flavored rum (e.g., MALIBU® rum). The coconut chocolate ganache can be prepared using the method described above in connection with FIG. 4.

The Asian glaze layer 140 may comprise 675 g of white chocolate, 810 g of double cream, 100 g of chopped pandan leaves, 300 g of fresh lemongrass, 2 vanilla pods and 10 sheets of gelatin in leaf form. To prepare this glaze, the cream is first boiled together with the pandan leaves, lemongrass, and vanilla. The boiled mixture is then added to the melted white chocolate. Separately, the gelatin sheets are soaked in cold water for about 10 minutes. The moist, pliable sheets are then squeezed to remove the absorbed water, and then the gelatin sheets are melted with a low heat (preferably, in a microwave oven at low intensity for approximately one minute). The gelatin, now in liquid form, is subsequently added to the cream/chocolate mix. Finally, the resulting mixture is passed through a fine sieve. The glaze is preferably spread on top of layer 160 (following removal of the cake from the freezer) soon after the glaze has been prepared.

Again, the relative strengths and proportions of the ingredients used in the Asian flavor combination, enables many of the flavors to be emphasized and tasted in a sequential manner. More specifically, in the above-described embodiment, by holding a small portion up to his/her nose, a consumer of the cake first predominantly smells the coconut and vanilla. After taking a bite of the cake and during the first few chews, the lemongrass and white chocolate flavors are emphasized. With further chewing (e.g., just before the consumer swallows), the infused mango and pandan flavors take over. Finally, once swallowed, a cleansing aftertaste of ginger is provided to the consumer.

The Scandinavian Cake

In another flavor combination of the present invention, a Scandinavian opera cake with ingredients of Scandinavian origin is provided. The Scandinavian opera cake incorporates the novel combination of mulled wine (i.e., glögg), rhubarb, and elder flower (i.e.. fläder) flavors. Preferably, the Scandinavian opera cake further incorporates apple and orange flavors as well.

Figure 7:
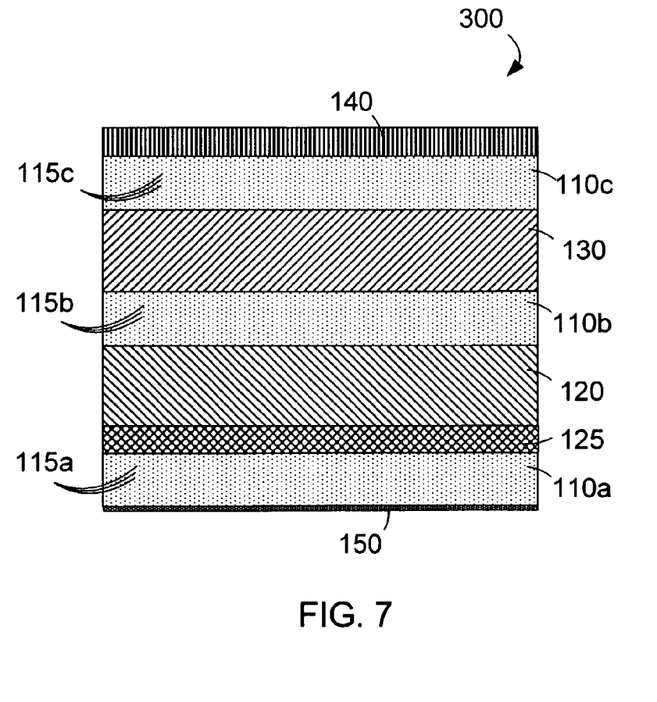
FIG. 7 is a side view showing the general layout of the layers in an opera cake in another embodiment of the present invention.

The Scandinavian opera cake is preferably implemented in the form of opera cake 300, the general layout of which is shown in FIG. 7. The layout of cake 300 is similar to that for cake 100 in FIG. 2, except that cake 300 includes a further intermediate filling layer 125 adjacent layer 120 (and between sponge layers 110a and 110b). During the assembly of cake 300, intermediate layer 125 is spread on top of sponge layer 110a and allowed to set (if necessary), followed by which intermediate filling layer 120 is spread on top of layer 125. Filling layer 125 preferably has a crunchy texture.

In a preferred embodiment of the Scandinavian opera cake, sponge layers 110 are soaked with a glögg syrup 115a, 115c and an elder flower syrup 115b; intermediate filling layer 125 comprises a rhubarb crunch layer; intermediate filling layer 120 comprises a rhubarb ganache jelly; intermediate filling layer 130 comprises an apple jelly layer; and glaze layer 140 comprises a glögg and milk chocolate base. Base layer 150 is preferably a dark chocolate layer. As with other embodiments, it will be appreciated that these layers may be ordered in numerous other manners.

Specific preferred compositions (and, where appropriate, methods of preparation) are now given for these layers of the Scandinavian cake. Again, the exemplary quantities of ingredients referred to below are used to fill three opera cake trays, each tray being approximately 60 cm×40 cm (i.e., the size of a commercial baking tray). These amounts may be scaled up or down as desired.

Glögg syrup 115a, 115c comprises 2500 g of red wine, 20 g of cinnamon, and 10 whole cloves (i.e., about 4 g). Preferably, the glögg syrup further comprises 500 g of red vermouth, 10 g of ginger powder, 1 whole pealed Seville orange (average sized), 20 g of cardamom, 20 g of bay leaves, 2 vanilla pods, 40 g of star anis, and 5 peppercorns (i.e., about 1-2 g of black pepper). The glögg syrup is prepared by mixing all of the above ingredients together, and then bringing the mixture to a boil. The mixture is then allowed to continue boiling until it is reduced to about 2100 g (thereby intensifying its flavor). The reduced mixture is then passed through a tea strainer (eliminating about 100 g) and allowed to cool. Preferably, the syrup is used when it reaches a temperature of about 6° C. 1800 g of the glögg syrup is used to soak layers 110a and 110c and, as described below, the remaining 200 g of the glögg syrup is preferably used to prepare glaze layer 140 in the Scandinavian cake.

Elder flower syrup 115b may comprise 2000 g of sparkling water, 120 g of elderflower (i.e., fläder) tea leaves, 200 g of honey, and 40 g of juniper berries. To prepare this syrup, the ingredients are mixed together and then boiled, allowed to steep for about two hours, sieved, and then cooled. Preferably, the syrup is used when it reaches a temperature of about 6° C.

Rhubarb chocolate ganache layer 120 may comprise 520 g of rhubarb purée, 70 g of invert sugar, 70 g of vodka, 1215 g of milk chocolate, 185 g of heavy cream, and 90 g of butter. The rhubarb chocolate ganache can be prepared using the method described above in connection with FIG. 4. Although, once ready, the rhubarb chocolate ganache is spread on top of rhubarb crunch layer 125 to form layer 120, a portion of the rhubarb chocolate ganache (or, alternatively, a separately prepared portion) is first used to prepare the rhubarb crunch 125 as described below.

Apple jelly layer 130 may comprise 1300 g of apple purée, 130 g of apricot jam, and 24 sheets of gelatin in leaf form. Prior to being used, the gelatin sheets are softened by soaking them in cold water for about 10 minutes and then squeeze-drying them to remove the water. After this soaking process, the gelatin sheets weigh approximately 225 g. To prepare this jelly, the apple purée and jam are mixed and brought to a boil, and the softened gelatin sheets are then added to the mixture which is subsequently allowed to cool. Preferably, the apple jelly is used when it reaches a temperature of about 6° C. As described below, a portion of the apple jelly (350 g) is also used to prepare the rhubarb crunch 125.

(In one alternative embodiment of the Scandinavian cake, sponge layer 110c is soaked with an apple syrup instead of the glögg syrup. This apple syrup may be prepared in the same manner as apple jelly layer 130 above.)

Rhubarb crunch 125 may comprise 350 g of hazelnut or praline crunch (e.g., the CACAO BARRY® or ATLAS brands of Pailleté Feuilletine), 350 g of the above-described rhubarb ganache, and 350 g of the above-described apple jelly. These crispy wafers are prepared by simply combining the crunch, rhubarb ganache, and apple jelly together, and then spreading the resulting crunch mixture on top of sponge layer 110a to provide filling layer 125.

The Scandinavian glaze layer 140 may comprise 165 g of the above-prepared glögg syrup, 630 g of milk chocolate, 540 g of neutral glaze, 165 g of heavy cream, and 4 sheets of gelatin in leaf form. This glaze may be prepared by bringing the glögg syrup and the neutral glaze to a boil in a first pan/container. Half of the milk chocolate is melted in a second container and then combined with the other, non-melted, half (which has been chopped) to provide a half-melted chocolate state.

In another container, the cream is brought to a boil and then poured over the half-melted milk chocolate. The cream and chocolate mixture is stirred continuously until a smooth emulsion results. The gelatin sheets are then softened by placing them in cold water for about 10 minutes followed by squeezing to remove the absorbed water. These softened gelatin sheets are added to the glögg/glaze mix. Subsequently, the glögg/glaze/gelatin mix is added to the emulsified chocolate/cream mixture. As a final step, the resulting combination is passed through a sieve. This glaze is preferably spread on top of sponge layer 110c (following removal of the cake from the freezer) soon after the glaze has been prepared.

Again, the relative strengths and proportions of the ingredients used in the Scandinavian flavor combination, enables many of its flavors to be emphasized and tasted in a sequential manner. More specifically, in the above-described embodiment, by holding a small portion up to his/her nose, a consumer of the cake first predominantly smells the red wine. After taking a bite of the cake and during the first few chews, the elderflower and apple flavors are emphasized. With further chewing (e.g., just before the consumer swallows), the rhubarb, cinnamon and milk chocolate flavors are brought to the forefront. Finally, once swallowed, an aftertaste of the cloves, pepper, and ginger flavors takes over.

The Mediterranean Cake

In another flavor combination of the present invention, a Mediterranean opera cake with ingredients of Mediterranean origin is provided. The Mediterranean opera cake incorporates the novel combination of lavender, basil, and cassis (i.g.. black currant) flavors. Preferably, the Mediterranean opera cake further incorporates grappa, balsamic, and tomato flavors as well.

Figure 8:
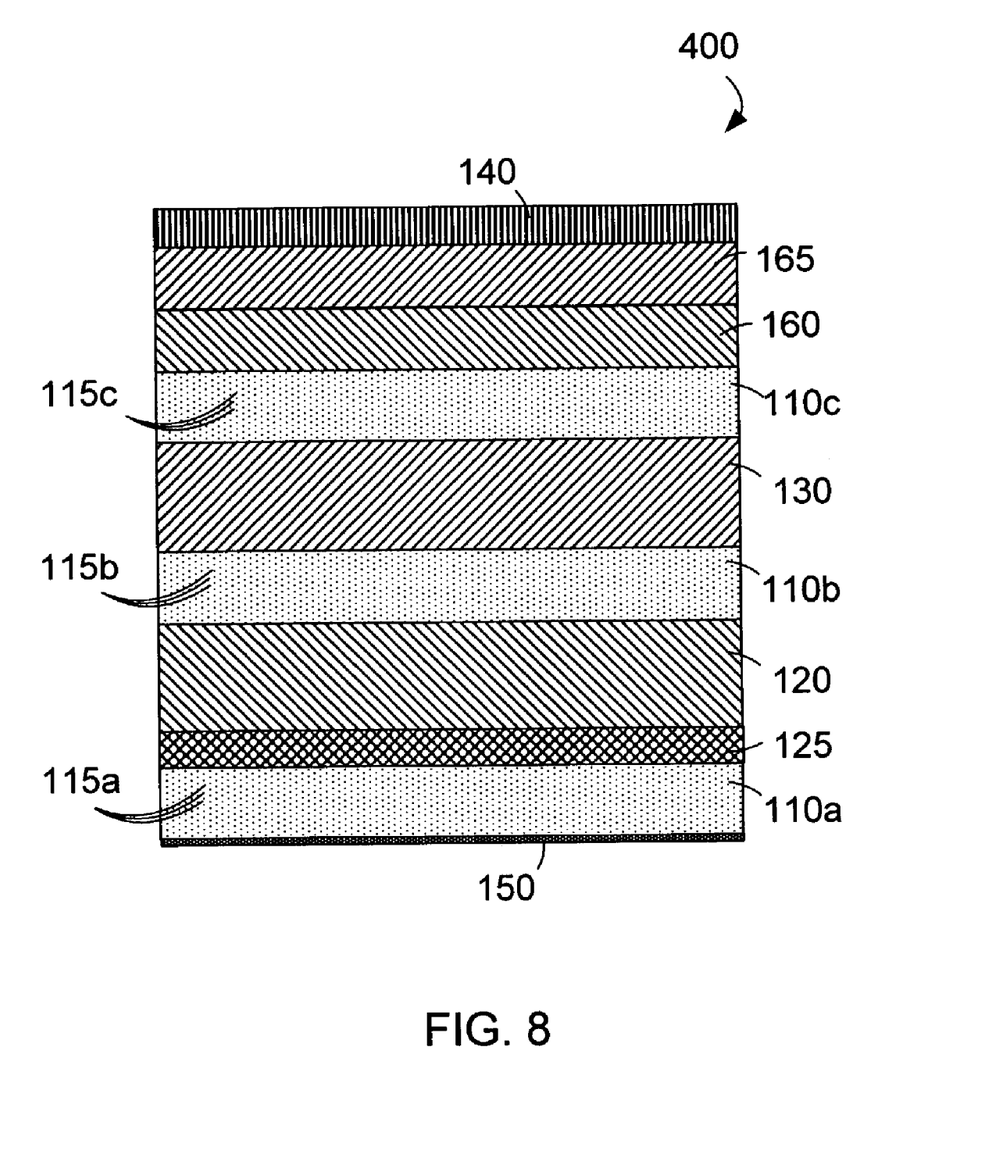
FIG. 8 is a side view showing the general layout of the layers in an opera cake in yet another embodiment of the present invention.

The Mediterranean opera cake is preferably implemented in the form of an opera cake 400, the general layout of which is shown in FIG. 8. The layout of cake 400 is similar to that for cake 200 in FIG. 6, except that cake 400 includes a further intermediate filling layer 125 adjacent layer 120 (and between sponge layers 110a and 110b) as well as another filling layer 165 between filling layer 160 and glaze layer 140, as shown. During the assembly of cake 300, intermediate layer 125 is spread on top of sponge layer 110a and allowed to set (if necessary), followed by which intermediate filling layer 120 is spread on top of layer 125. Filling layer 165 is similarly spread on top of filling layer 160 which, if necessary, had been previously allowed to set. Again, filling layer 125 preferably has a crunchy texture.

In a preferred embodiment of the Mediterranean opera cake, sponge layers 110 are soaked with a lavender syrup 115a, a basil syrup 115b, and a balsamic syrup 115c; intermediate filling layer 125 comprises a crispy wafer layer; filling layers 120 and 160 each comprise a layer of cassis jelly; filling layers 130 and 165 each comprise a lavender ganache layer; and glaze layer 140 comprises a caramel/custard base. Base layer 150 is preferably a milk chocolate layer. As with all cakes of the present invention, it will be appreciated that these layers may be ordered differently and in numerous other manners.

Specific preferred compositions (and, where appropriate, methods of preparation) are now given for these layers of the Mediterranean cake. As is the case throughout this description, the exemplary quantities of ingredients referred to below are used to fill three opera cake trays, each tray being approximately 60 cm×40 cm (i.e., the size of a commercial baking tray). These amounts can be scaled up or down as desired.

Lavender syrup 115a may comprise 2250 g of white wine (preferably a pinot grigio), 90 g of dried lavender leaves, and 90 g coriander seeds. The lavender syrup may be prepared by boiling all of these ingredients together until the mixture is reduced to about 1200 g (i.e., roughly in half). The boiled mixture is then passed the through a sieve and allowed to cool in a refrigerated environment. Preferably, the syrup is used when it reaches a temperature of about 4° C.

Basil syrup 115b may comprise 875 g of grappa and 1000 g of grape juice mixed with 100 g of fresh basil leaves. As is well known, grappa is made from distilling pomace (grape skins) left over from a wine-making process. To prepare this syrup, the mixture is boiled, allowed to reduce to about 1200 g, steeped, and then cooled. Preferably, the syrup is used when it reaches a temperature of about 6° C.

Balsamic syrup 115c may comprise 150 g of commercially available balsamic vinegar, 200 g of brown sugar, and 250 g of tomato juice. This syrup may be prepared simply by warming all of the ingredients together in a small pot until the sugar has dissolved.

Crispy wafers 125 may comprise 275 g of hazelnut or praline crunch (e.g., the CACAO BARRY® or ATLAS brands of Pailleté Feuilletine), 150 g of cocoa butter, and 150 g of praline paste. These crispy wafers may be formed by melting the cocoa butter in a microwave and then mixing it into the praline paste to form an emulsion. The crunch is then subsequently added in, and again the combination is mixed well. The resulting crispy wafers are then spread on top of sponge layer 110a to form filling layer 125.

Cassis jelly layers 120 and 160 may each comprise 1500 g of cassis purée, 375 g of honey, and 24 sheets of gelatin in leaf form (weighing approximately 225 g when soaked in water). To prepare this jelly, the cassis purée and honey are mixed and brought to a boil, and the softened gelatin sheets are then added to the mixture which is subsequently allowed to cool. As described above, to soften the gelatin sheets they are first soaked in cold water for about 10 minutes and then squeezed to remove the absorbed water. Preferably, the cassis jelly is used when it reaches a temperature of about 6° C. The above method provides about 2100 g of cassis jelly, 1500 g of which are spread on top of crispy wafer layer 125 to form layer 120, while the remainder is spread on top of sponge layer 110c to form layer 160.

Lavender chocolate ganache layers 130 and 165 may comprise 6 g of dried lavender leaves, 170 g of invert sugar, 60 g of gin, 1120 g of milk chocolate, 840 g of heavy cream, and 210 g of butter. The lavender chocolate ganache can be prepared using the method described above in connection with FIG. 4. This method provides about 2400 g of lavender chocolate ganache, 1800 g of which are spread on top of sponge layer 110b to form layer 130, while the remaining 600 g is spread on top of layer 160 to form layer 165.

The Mediterranean glaze layer 140 may comprise 440 g of sugar, 750 g of heavy cream, 250 g of milk, 160 g of egg yolk, and 7 sheets of gelatin in leaf form. This glaze may be prepared by first caramelizing 300 g of the sugar by slowly cooking it in a pan over a low heat. Next, the caramelized sugar is deglazed by adding the cream to the bottom of the pan, thereby liquefying the caramelized drippings. The milk, egg yolks, and the remaining 140 g of sugar are then combined with the deglazed liquid in a heavy bottom pot. The mixture is cooked slowly over a low flame until the temperature reaches approximately 83° C., and a custard is formed. The gelatin sheets are softened by placing them in cold water for about 10 minutes and then squeezing them to remove the absorbed water. As a final step, the softened gelatin sheets are added and then mixed in. The glaze is preferably spread on top of sponge layer 110c (following removal of the cake from the freezer) soon after the glaze has been prepared.

For applications in which preservation by freezing is desired, the custard-based glaze described above for the Mediterranean cake is preferably altered by replacing the egg yolks with 160 g of tomato juice. When frozen, the resulting tomato cream glaze layer can be preserved for long periods similar to the other layers in the Mediterranean cake.

As with the other cakes described above, the relative strengths and proportions of the ingredients used in the Mediterranean flavor combination, enables many of its flavors to be emphasized and tasted in a sequential manner. More specifically, in the above-described embodiment, by holding a small portion up to his/her nose, a consumer of the cake first predominantly smells the basil and milk chocolate. After taking a bite of the cake and during the first few chews, the lavender and grappa flavors are emphasized. With further chewing (e.g., just before the consumer swallows), the cassis, tomato, and praline flavors are brought to the forefront. Finally, once swallowed, a balsamic aftertaste takes over.

The Australian Cake

In another flavor combination of the present invention, an Australian opera cake with ingredients of Australian origin is provided. The Australian opera cake incorporates the novel combination of passion fruit, mint, and eucalyptus flavors into an opera cake. Preferably, the Australian opera cake further incorporates coriander, apple, and mango flavors as well.

The Australian opera cake is preferably implemented in the form of opera cake 100 in FIG. 2. In a preferred embodiment of the Australian opera cake, sponge layers 110 are soaked with a mint syrup 115a, 115c and a eucalyptus tea syrup 115b; intermediate filling layer 120 comprises a passion fruit jelly layer; intermediate filling layer 130 comprises a mint ganache layer; and glaze layer 140 includes a milk/dark chocolate base. Base layer 150 is preferably a dark chocolate layer. It will again be appreciated that the above layers may be ordered in various other manners.

Specific preferred compositions (and, where appropriate, methods of preparation) are now given for the preferred layers in the Australian cake. As above, the exemplary quantities of ingredients referred to below are used to fill three opera cake trays, each tray being approximately 60 cm×40 cm (i.e., the size of a commercial baking tray). To produce different amounts of cake, these quantities may be scaled up or down as desired.

Mint syrup 115a/115c may comprise 1320 g of apple juice, 575 g of honey, 90 g of fresh grated ginger, 90 g of fresh mint leaves, 45 g of fresh coriander, 45 g of cardamom seeds, 230 g of lemongrass, and 20 sheets of gelatin in leaf form. To prepare this syrup all of the ingredients except the gelatin sheets are mixed together and brought to a boil. The gelatin sheets are softened by soaking and squeeze-drying as described above. The softened sheets are then added to the other ingredients and the mixture is allowed to cool. Preferably, the mint syrup is used when it reaches a temperature of about 4° C.

Eucalyptus tea syrup 115b may comprise 75 g of dry eucalyptus tea leaves (e.g., eucalyptus tea or eucalyptus mint tea), 560 g of mango purée, 560 g of apple juice, and 8 sheets of gelatin in leaf form. The eucalyptus tea syrup may be prepared by steeping the dry tea leaves in cool water for about 24 hours and then straining (i.e., sieving) the tea stock through a tea strainer. About one-quarter of this sieved tea base is warmed in a microwave or small sauce pan until just before the boiling point. The softened (i.e., previously soaked and squeeze-dried) gelatin sheets are then added to the warmed one-quarter base. To remove any small gelatin pieces, the warmed base may then be sieved, following which it is recombined with the remaining three-quarters of the sieved tea base (which remained at room temperature).

Passion fruit jelly 120 may comprise 1,000 g of passion fruit purée, 200 g of mango purée, 200 g of honey, orange zest (i.e., grated orange peel) from 6 oranges, and 16 sheets of gelatin in leaf form. The passion fruit jelly is prepared by mixing all of the ingredients except the gelatin sheets together and then bringing the mixture to a boil. The softened (i.e., previously soaked and squeeze-dried) gelatin sheets are then added, and the mixture is allowed to cool. Preferably, the jelly is used when it reaches a temperature of about 6° C.

Mint chocolate ganache 130 may comprise 90 g of chopped fresh mint leaves, 60 g of glucose, 350 g of dark chocolate, 350 g of milk chocolate, and 350 g of heavy cream. The mint chocolate ganache can be prepared using the method described above in connection with FIG. 4, with the additional steps of allowing the mixture of fresh mint leaves, glucose, and heavy cream to steep for about two hours after it has been brought to boil (in step 70 of FIG. 4) and then of sieving the mixture. In addition, it should be noted that since this mint ganache comprises both dark and milk chocolate, each of steps 78 and 82 in FIG. 4 is carried out for the respective type of chocolate.

Australian glaze layer 140 may comprise 300 g of dark chocolate, 50 g of milk chocolate, and 150 g of cocoa butter. To prepare this glaze, all of the ingredients are combined in a plastic container and then placed in a microwave oven at low intensity until melted. The melted mixture is passed through a fine sieve, and then filled into a chocolate spray gun (or alternatively a plastic squirt bottle). The glaze is then preferably applied to the frozen Australian cake layers (per step 192 in FIG. 5), by spraying the chocolate mix on top sponge layer 110c immediately after the frozen cake layers are removed from the freezer.

Again, the relative strengths and proportions of the ingredients used in the Australian flavor combination, enables many of its flavors to be emphasized and tasted in a sequential manner. More specifically, in the above-described embodiment, by holding a small portion up to his/her nose, a consumer of the cake first predominantly smells the eucalyptus. After taking a bite of the cake and during the first few chews, the passion fruit flavor is emphasized. With further chewing (e.g., just before the consumer swallows), the mint and dark chocolate flavors are brought to the forefront. Finally, once swallowed, an aftertaste of the tea and (again) eucalyptus flavors takes over.

As each of the above-described flavor combinations uniquely merges ingredients from a particular geographic location/culture of the world into a dessert cake, these four cakes (or a subset of them) may be advantageously presented, sold, or served as a set (or as part of a set). For example, the cakes may be offered to patrons of a restaurant on a common dessert menu. Alternatively, a package of cakes that includes different cakes of the flavor combinations above may be sold in grocery stores. While cake series, such as varying types of cheesecake, are known, the individual cakes in such series, though different, do not have the customer-appealing benefit associated with each cake representing a different geographic location or culture.

While the invention has been described in conjunction with specific embodiments, it is evident that numerous alternatives, modifications, and variations will be apparent to those skilled in the art in light of the foregoing description.

The invention claimed is:

1. A multi-flavored dessert cake comprising a plurality of sponge cake portions, each sponge cake portion capable of absorbing a flavored syrup, wherein at least one sponge cake portion is soaked with a syrup having a first flavor and at least one other sponge cake portion is soaked with a syrup having a second flavor, the second flavor being different from the first flavor; the cake further comprising at least one filling portion having a third flavor that is different from the first and second flavors; and wherein the first, second, and third flavors comprise one of the following flavor combinations:

i) a first flavor combination in which one of the first, second, and third flavors comprises a lemongrass flavor, another of the first, second, and third flavors comprises a mango flavor, and another of the first, second, and third flavors comprises a caramel flavor, and wherein in addition to the first flavor combination the cake further has the additional flavors of pineapple, ginger, pandan, and coconut;

ii) a second flavor combination in which one of the first, second, and third flavors comprises a mulled wine flavor, another of the first, second, and third flavors comprises a rhubarb flavor, and another of the first, second, and third flavors comprises an elderflower flavor;

iii) a third flavor combination in which one of the first, second, and third flavors comprises a lavender flavor, another of the first, second, and third flavors comprises a basil flavor, and another of the first, second, and third flavors comprises a cassis flavor; or iv) a fourth flavor combination in which one of the first, second, and third flavors comprises a passion fruit flavor, another of the first, second, and third flavors comprises a mint flavor, and another of the first, second, and third flavors comprises a eucalyptus flavor.

2. The multi-flavored dessert cake of claim 1 wherein the first, second, and third flavors comprise the first flavor combination.

3. The multi-flavored dessert cake of claim 2 comprising:
   at least one sponge cake portion soaked with a syrup having a lemongrass flavor;
   at least one sponge cake portion soaked with a syrup having a caramel flavor;
   at least one filling portion having a lemongrass flavor and a chocolate flavor; and
   at least one filling portion having a mango flavor.

4. The multi-flavored dessert cake of claim 3 wherein:
   the at least one filling portion having the mango flavor is a jelly and further has a ginger flavor;

the at least one filling portion having the lemongrass and chocolate flavors is a ganache, and wherein the chocolate flavor in said filling portion is a white chocolate flavor;

the syrup having the lemongrass flavor further has a pineapple flavor;

and wherein the cake further comprises:

at least one filling portion having a coconut flavor, a pandan flavor, and a chocolate flavor; and a top glaze portion having a lemongrass flavor, a pandan flavor, and a white chocolate flavor.

5. The multi-flavored dessert cake of claim 1 wherein the first, second, and third flavors comprise the second flavor combination.

6. The multi-flavored dessert cake of claim 5 wherein the cake further has an apple flavor and an orange flavor.

7. The multi-flavored dessert cake of claim 6 comprising:

at least one sponge cake portion soaked with a syrup having a mulled wine flavor;

at least one sponge cake portion soaked with a syrup having an elderflower flavor, at least one filling portion having a rhubarb flavor and a chocolate flavor; and at least one filling portion having an apple flavor.

8. The multi-flavored dessert cake of claim 7 wherein:

the at least one filling portion having the rhubarb and chocolate flavors is a ganache, and wherein the chocolate flavor in said filling portion is a milk chocolate flavor;

the at least one filling portion having the apple flavor is a jelly;

and wherein the cake further comprises:

at least one filling portion having a rhubarb flavor and a crunchy texture; and a top glaze portion having a mulled wine flavor and a milk chocolate flavor;

and wherein the mulled wine flavor includes a clove flavor, a cinnamon flavor, and a Seville orange flavor.

9. The multi-flavored dessert cake of claim 1 wherein the first, second, and third flavors comprise the third flavor combination.

10. The multi-flavored dessert cake of claim 9 wherein the cake further has the following additional flavors: grappa, balsamic, and tomato.

11. The multi-flavored dessert cake of claim 10 comprising:

at least one sponge cake portion soaked with a syrup having a lavender flavor;

at least one sponge cake portion soaked with a syrup having a basil flavor;

at least one sponge cake portion soaked with a syrup having a balsaniic flavor;

at least one filling portion having a cassis flavor; and at least one filling portion having a lavender flavor and a chocolate flavor.

12. The multi-flavored dessert cake of claim 11 wherein:

the at least one filling portion having the cassis flavor is a jelly;

the at least one filling portion having the lavender and chocolate flavors is a ganache, and wherein the chocolate flavor in said filling portion is a milk chocolate flavor;

the syrup having the basil flavor further has a grappa flavor and a grape juice flavor;

the syrup having the balsamic flavor further has a tomato flavor; and wherein the cake further comprises a top glaze portion having one of the following: an egg custard flavor or a tomato flavor.

13. The multi-flavored dessert cake of claim 1 wherein the first, second, and third flavors comprise the fourth flavor combination.

14. The multi-flavored dessert cake of claim 13 wherein the cake further has the following additional flavors: coriander, apple, and mango.

15. The multi-flavored dessert cake of claim 14 comprising:

at least one sponge cake portion soaked with a syrup having a mint flavor;

at least one sponge cake portion soaked with a syrup having a eucalyptus flavor;

at least one filling portion having a passion fruit flavor; and at least one filling portion having a mint flavor and a chocolate flavor.

16. The multi-flavored dessert cake of claim 15 wherein:

the at least one filling portion having the passion fruit flavor is a jelly and further has a mango flavor;

the at least one filling portion having the mint and chocolate flavors is a ganache, and wherein the chocolate flavor in said filling portion is a combination of a milk chocolate flavor and a dark chocolate flavor;

the syrup having the mint flavor further has a coriander flavor;

the syrup having the eucalyptus flavor comprises eucalyptus tea and further has a mango flavor and an apple flavor; and the cake further comprises a top glaze portion having a chocolate flavor.

17. The multi-flavored dessert cake of claim 1 wherein the sponge cake layers comprise at least 4% butter, 20% nuts, and 25% whole eggs in terms of pre-cooked ingredient weight.

18. The multi-flavored dessert cake of claim 1 wherein the cake is an opera cake, each portion is a layer within the opera cake, and at least one filling layer lies between any two sponge cake layers.

* * * * *